United States Patent

Hori

Patent Number: 5,816,714
Date of Patent: Oct. 6, 1998

[54] PRINTER HAVING PRINT DATA STORAGE UNIT

[75] Inventor: Masaaki Hori, Tajimi, Japan

[73] Assignee: Brother Kogyo Kabushiki Kaisha, Nagoya, Japan

[21] Appl. No.: 681,391

[22] Filed: Jul. 23, 1996

[30] Foreign Application Priority Data

Jul. 28, 1995 [JP] Japan .................................. 7-192976

[51] Int. Cl.⁶ ........................................ B41J 5/30
[52] U.S. Cl. .................. 400/61; 400/70; 395/115
[58] Field of Search .................. 395/115, 116; 400/70, 61, 279, 323

[56] References Cited

U.S. PATENT DOCUMENTS

| | | | |
|---|---|---|---|
| 3,651,487 | 3/1972 | Washington | 340/172.5 |
| 4,048,625 | 9/1977 | Harris, Jr. et al. | 364/900 |
| 5,102,244 | 4/1992 | Takeda | 400/121 |
| 5,440,684 | 8/1995 | Tack et al. | 395/164 |

FOREIGN PATENT DOCUMENTS

A-4-35966  2/1992  Japan .

*Primary Examiner*—John S. Hilten
*Attorney, Agent, or Firm*—Oliff & Berridge, PLC

[57] ABSTRACT

A print data storing unit connected to a printing mechanism of a printer for storing print data and sending the data to the printing mechanism. The storing unit includes a buffer memory which has a data storing region A having a storage capacity capable of storing therein data of one line and a temporary data storing region B having a storage capacity half the storage capacity of the data storing region A. The data storing region A is divided into two storage sections, and each storage section is divided into right storage section A1, A3 and left storage section A2 and A4. Print data of a first line are stored in the data storing region A, and when printing is started based on the print data, storage of print data of the front half portion of a second line in the temporary data storing region B is started. When the half portion of the first line is printed, storage into the empty section A1 and A3 of print data of a remaining rear half portion of the second line is started. Upon completion of first line printing, the print data stored in the storage sections A1 and A3 are transferred to the storage sections A3 and A4, and the data stored in the temporary storing region B is transferred to the sections A1 and A2 for the second line printing.

25 Claims, 5 Drawing Sheets

PRINTER HAVING PRINT DATA STORAGE UNIT

BACKGROUND OF THE INVENTION

The present invention relates to a printer, and more particularly, to print data storage unit for printing image with a printing mechanism in accordance with the stored print data.

A printer such as an ink jet type printer has an ink ejection head as a printing mechanism. The ink ejection head is movable in a scanning direction or printed character array direction (in a direction parallel with a platen), and a plurality of nozzles are arrayed in a sheet feeding direction (in a direction perpendicular to the scanning direction) in the ink ejection head. Print data are normally constituted by the data of one line printing through the one scan of the ink ejection head with the ink ejections through the nozzle array. That is, the printer has a data buffer in which the data of one line transmitted from a host computer can be stored. When the data of one line printing is stored in the buffer, printing operation is started. When, one line printing is completed, the data of next line from the host computer is received in the buffer. Such sequential process will be shown in the following Table 1:

TABLE 1

Time →

Host Comp. ←— Send —→   ←— Send —→   ←— Send —→

Printer   ←—— Data In —✕— Print —✕— Data In —✕— Print —✕— Data In —✕— Print

As is apparent from the Table 1, the host computer cannot transmit print data to the printer when the printer performs printing operation. Therefore, the entire printing system including the printer and the host computer cannot make effective use of the performance of the printer.

If the respective printing period is extremely shorter than the data transmission period, the above described problem does not largely affect the entire printing operation, because the actual printing period does not largely occupy the entire printing operation period. Further, printer can exhibit its efficiency almost perfectly, if other mechanism in the printer is still operated for performing deceleration of the ink ejection head and/or sheet feeding even after the completion of one line printing operation of the printing mechanism, and if data transmission of all print data of the next line from the host computer to the print buffer can be completed during the period of deceleration and sheet feeding process. Therefore, if scale or amount of one line print data is not so large, the above described sequence in Table 1 does not largely affect the entire printing operation.

However, in accordance with the progress of a printer, intricate control is performed in the host computer. Accordingly, amount of data of one line printing is also increased. Thus, the above described problem is becoming into our attention. Particularly, there is a printer, like a dot matrix type printer, capable of printing figures based on a figure data in the host computer. In such a case, the host computer has image data with which the host computer commands printing pattern to the printer. Thus, the amount of data of one line printing is greatly increased. Further, even if the data transmitting period is short, this shortened transmitting period cannot be ignored due to the recent progress in printing speed achieved by the recent printer. The printing period for printing one line is shortened or improved relative to the data transmission period.

In order to overcome the above described drawback, a line buffer has two buffer sections, and each section is alternately used, so that the next line data can be received into one of the buffer sections during one line printing based on the line data stored in the other buffer section. This sequential process will be shown in the following Table 2:

TABLE 2

Time →

Host Com. ←— Data Out —✕— Data Out —✕— Data Out —✕— Data Out —✕— Data Out —→

1st Buf.   ←— Data In —✕— Print —✕— Data In —✕— Print —✕— Data In —→

2nd Buf.            ←— Data In —✕— Print —✕— Data In —✕— Print —→

That is, upon receipt of the print command from the first buffer section, operation for printing the one line is started. At the same time, data of the second line is transmitted from the host computer to the second buffer section. With this process, the host computer can continuously transmit line print data, and the printing mechanism of the printer can be controlled to exhibit its maximum printing efficiency.

However, the line buffer must be capable of storing two line printing data, and therefore, large capacity is required in the line buffer. Accordingly, large amount of storage location is required in a RAM for this purpose, which may increase cost of the printer. Further, in the recent trend, high resolution power is required in the ink jet type printer. This increases the amount of line data, and requires increased capacity of the line buffer, thereby increasing cost of the printer.

In order to solve this problem, Japanese patent Application Kokai No. Hei 4-35966 discloses three buffer sections A, B, C, each for storing 0.5 or half line print data. One line print data is stored in two buffer sections, and, the stored line print data is successively read for one line printing. For example, a combination of buffer sections A and B, A and C, and B and C is successively provided for the line print data storage. For example, assuming that the first line data are stored in the buffer sections A and B, and front half line has been printed, as a result of the discharge of the half line print data from one buffer section A, then, a half line print data of the next line is to be stored in the buffer section A. and another half line data of the next line is stored in the remaining buffer section C.

Here, the first line printing is performed as a result of movement of the print head in one character array direction on the basis of the one line print data stored in the buffer sections A and B. However, the second line printing on the basis of the second line print data stored in the buffer sections A and C must be performed in opposite direction, i.e, during reversal movement of the print head. To this effect, rear half line of the next line printing must be printed in the second line printing prior to printing the front half line thereof. Then, for the third line printing, the third line print data are stored in the buffer sections B and C.

The buffer section C is used for the second line printing and the third line printing. Further, as described above, the second line printing must be performed reversely. Therefore, for the second line printing, the buffer section C must store the data of the rear half portion of the second line, and the buffer section A must store the data of the front half portion of the second line. With this storage manner, the data in the buffer section C is first used or discharged prior to the discharge of the data from the buffer section A. Thus, the data of the front half and rear half of the third line are stored into the buffer sections B and C, respectively.

According to the storage manner, there may be the case where the printing direction must be opposite when using the print data stored in the buffer sections A and B. In this case, the printing is performed with the data stored in the buffer section B, and then with the data stored in the buffer section A. Thus, the buffer section B is first empty and then, the buffer section A becomes empty. In this connection, print data can be stored into the buffer sections A and C for the next line printing after the buffer sections B and A become empty (buffer section C has been empty since the initial state). In other words, the data storage for the second line is started in a state where all buffer sections A, B, C are empty. Accordingly dead time or print stand-by period is disadvantageously prolonged.

SUMMARY OF THE INVENTION

It is therefore, an object of the present invention to overcome the above described drawbacks and to provide an improved print data storing unit or an improved printer having the print data storing unit which allows a printing mechanism to be operated at its maximum efficiency without increasing a cost.

Another object of the present invention is to provide such data storing unit or the printer capable of reducing dead time or stand-by period for acutal printing operation.

These and other objects of the present invention will be attained by a print data storing unit connected to a printing mechanism of a printer for storing print data and sending the print data to the printing mechanism having a print head, the printing mechanism performing printing on a printing sheet based on the print data, the unit including a printer data storing region, a temporary data storing region, a storage region command portion, a read portion, and a data transfer portion. The print data storing region is adapted for storing print data with which one time printing is performed by relative movement of the print head with respect to the printing sheet in one or opposite print-out direction. The temporary data storing region is adapted for temporarily storing another print data. The storage region command portion appoints one of the print data storing region and the temporary print data storage region so as to store print data into the appointed one of the regions. The read portion is adapted for sending the print data stored in the print data storing region to the printing mechanism so as to perform one time printing on the printing sheet. The data transfer portion is adapted for transferring the other data stored in the temporary data storing region into the print data storing region when an empty area is provided in the print data storing region as a result of sending of the print data to the printing mechanism. The print data storing region and the temporary data storing region have a total data storage capacity capable of storing data with which printing is performed in one time printing by relative movement of the print head with respect to the printing sheet in one or opposite print-out direction but incapable of storing data with which printing is performed twice by relative movement of the print head with respect to the printing sheet in one and opposite print-out direction.

In another aspect of the invention, there is provided a printer including a printing mechanism and the print data storing unit. The printing mechanism includes a print head, and a print head moving mechanism for providing a relative movement of the print head in a character array direction and a sheet feed direction with respect to a printing sheet. The print data storing unit is connected to the printing mechanism for storing print data and sending the print data to the printing mechanism. The print data storing unit has a buffer memory including the above described print data storing region and the temporary data storing region, the storage region command portion, the read portion, and the data transfer portion.

DETAILED DESCRIPTION OF THE PREFERRED EMBODIMENTS

Figure 1:
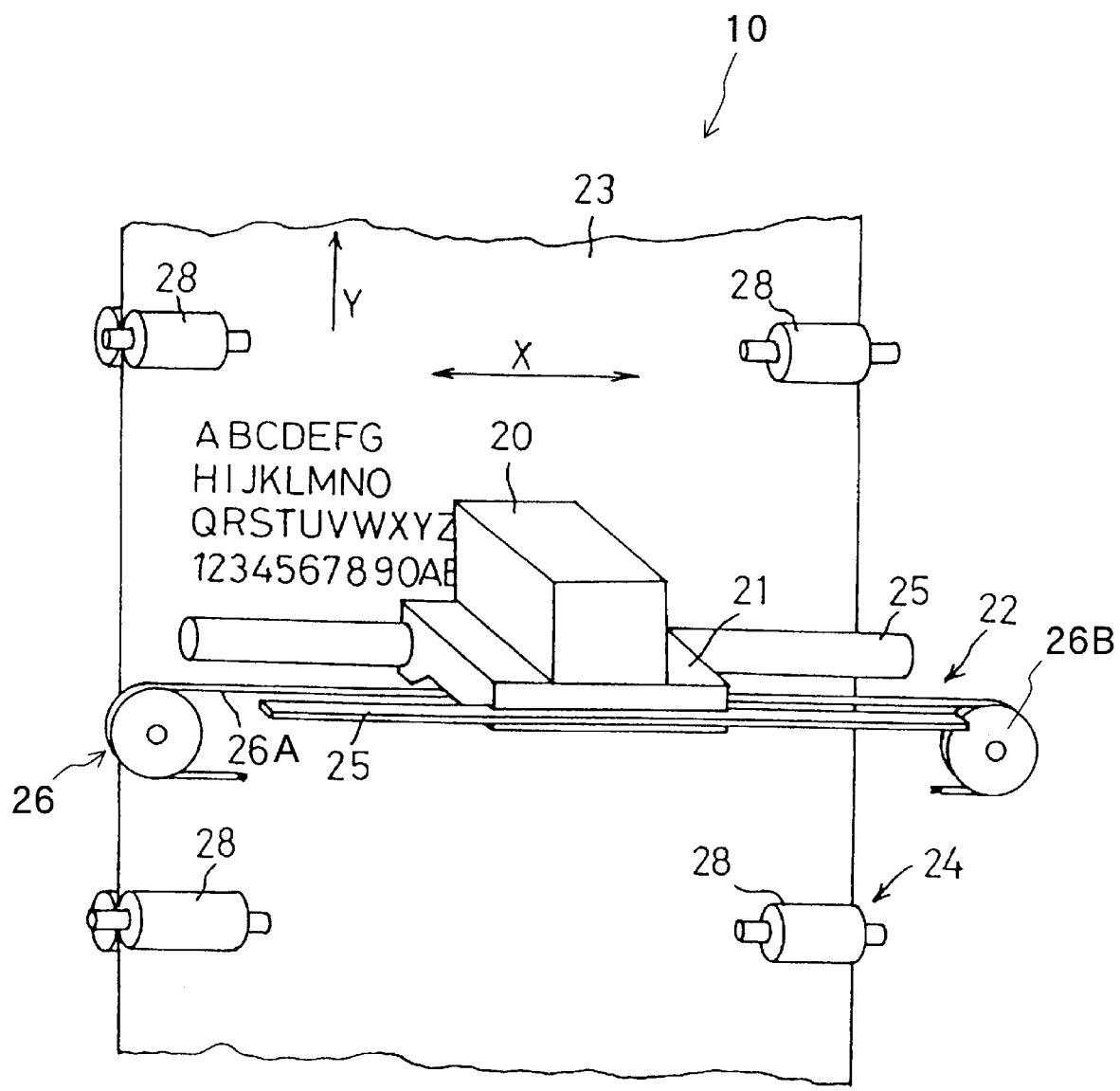
FIG. 1 is a schematic view showing a printing mechanism of a printer according to one embodiment of the present invention.

A printer according to one embodiment of the present invention will be described with reference to the drawings. First, a printing mechanism will be described with reference to FIG. 1.

A printing mechanism 10 includes a print head 20, a carriage 21, and moving mechanisms 22 and 24. The print head 20 serves as print means for printing image on an image recording medium or a sheet 23. The print head 20 is of an ink jet type head in which a plurality of nozzles serving as printing elements are arrayed at equal intervals in the sheet feed direction (Y direction). Ink is ejected from the selected nozzles onto the sheet 23 for forming an inked image thereon. Incidentally, throughout the specification and claims, the term "one line" implies the character array in the X direction formed by one way moving stroke of the print head 20 in the X direction. Therefore, the character array like "ABCDEFG" in FIG. 1 can be referred to as one line, and further, if the print head 20 can simultaneously provide two or more character arrays at the single moving stroke of the print head in the X direction, the latter case is also referred to "one line".

The print head 20 is mounted on the carriage 21 which is moved relative to the sheet 23 by the moving mechanism 22 and 24 in a character array direction (X direction) and a sheet feed direction (Y direction perpendicular to the X direction). The moving mechanism includes a first moving mechanism or a transfer mechanism 22 for moving the carriage reciprocatingly in the character array direction, and a second moving mechanism or a sheet feed mechanism 24 for moving sheet 23 in the sheet feed direction, so that the carriage is relatively moved in the sheet feed direction with respect to the sheet 23.

The transfer mechanism 22 includes guide rails 25, 25, an endless belt-pulley arrangement 26 having an endless belt 26A and pulleys 26B, and a drive motor (not shown). The guide rails 25, 25 is disposed in parallel with the sheet 23 and extend in the character array direction. Along the guide rails 25, 25, the carriage 20 is slidably and reciprocatingly moved. The belt 26A is connected to the carriage 21 and one of the pulleys 26B is connected to the drive motor. The pulley 26B is rotated alternately in one and reverse direction, so that the carriage 21 is moved reciprocatingly through the belt 26A. The sheet feed mechanism 24 includes rollers 28 whose rotation axes extends in the character array direction and disposed in parallel with the sheet 23, and drive motor (not shown) for driving these rollers 28.

Figure 2:
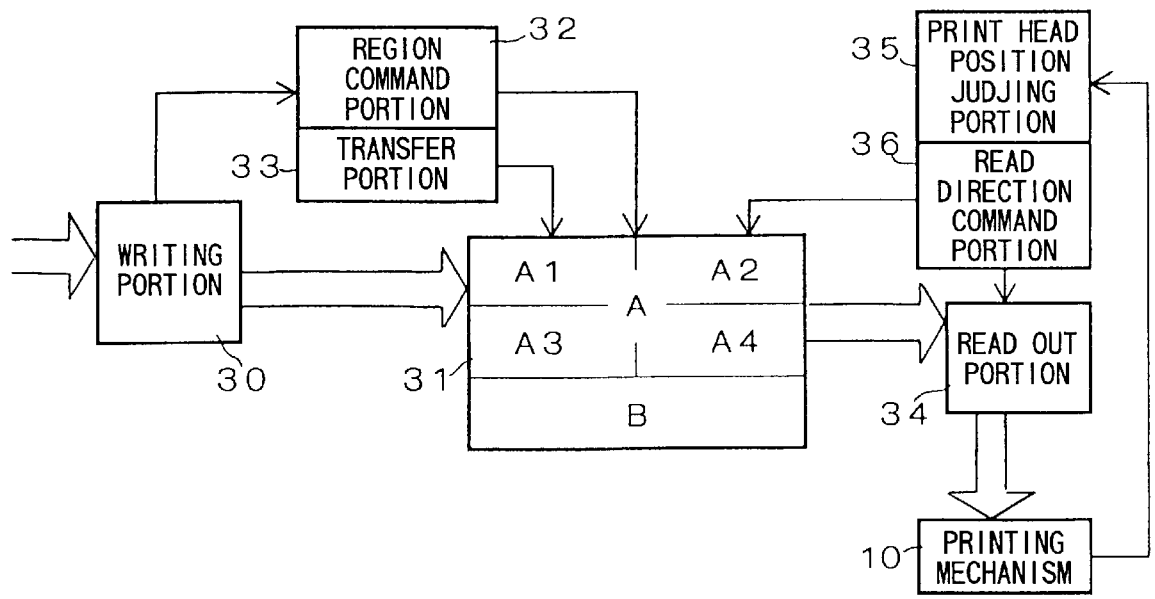
FIG. 2 is a block diagram showing a control circuit of a data storing unit according to the first embodiment.

An essential circuitry arrangement for establishing an improved data storage mode according to the present invention is shown in FIG. 2. The illustrated embodiment pertains to a host based printer in which print data from the host computer is directly received and printing is per formed with the print data. To a buffer memory 31 of a RAM, are connected a write-entry portion 30, a region command portion 32, a transfer portion 33, and a read out direction command portion 36. Further, a read out portion 34 is connected to the buffer memory 31, and the read out portion 34 is connected to the printing mechanism 10. Various data are transmitted from the host computer such as a personal computer (not shown), and print data among the various data is written or stored in the buffer memory 31 through the write-entry portion 30. The buffer memory 31 is divided into a plurality of buffer regions as described later, and for the storage of the print data, the region command portion 32 instructs a selected buffer region to the write-entry portion 30, so that print data is selectively stored in a selected buffer region in the buffer memory 31. Further, the transfer portion 33 is adapted for shifting or transferring print data from one buffer region to another in the buffer memory 31.

A print head position judging portion 35 is connected to the printing mechanism 10 for judging position of the print head in the character array direction. The read out direction command portion 36 judges leading end and trailing end of print data stored in the buffer memory 31, and computes the distance between the present position of the print head 20 and the leading end of one line to be printed, and the between the present print head position 20 and the trailing end of the line to be printed, and selects the smaller distance. The read out direction command portion 36 also instructs, to the first moving mechanism 22, the moving direction of the first moving mechanism 22 so that the print head 20 can start printing from the selected leading end or trailing end as a result of the selection of the smaller distance. The read out direction command portion 36 further instructs, to the read out portion 34, read out direction of the print data stored in the buffer memory 31 about either from the leading end or from the trailing end. The function of the read out direction command portion 36 is known from a conventional bidirectional minimum distance printing control.

The read out portion 34 is adapted to retrieve the print data stored in the buffer memory 31 in accordance with the read out direction instructed from the read out direction command portion 36, and transmit the retrieved print data to the printing mechanism 10.

Assuming that in the depicted embodiment, the one line is provided by 60 dots (in the sheet feed direction) X 2880 dots (in the character array direction), usable RAM area as a working area is 32K byte, and 400 ms is required for data retrieval for operating one line printing, and acceleration and deceleration period of the carriage 21 is 50 ms. Further, the print data transmitted from the host computer are so called raster scan image data. That is, print data of first dot line in the character array direction are successively transmitted by a unit of one byte, and upon completion of transmission of the data of the first dot line, print data of second dot line in the character array direction are transmitted.

A buffer size for constituting one raster is 360 byte (2880 dots/8=360B). Here, one dot pattern is stored with the correspondence with 1 bit. Therefore, necessary bytes are obtained by dividing the 2880 dots into 8 bits. Therefore, a buffer size capable of printing one line is 21600 bytes (60 dots×360 B=21600). Because the usable RAM area is 32 KB (32×1024 B=32768B), the usable RAM cannot store print data of two lines (21600×2=43200B).

If a conventional one line buffer control is executed, mechanically non-operational period occurs unless data of the one line is received during deceleration of the carriage. A maximum data transmission efficiency of a generally available printer parallel interface is about 100 KB/sec. Therefore, during the deceleration period, only 5120 B can be received provided that 50 ms is required from the completion timing of printing and completion timing of deceleration of the carriage (100×1024×0.05=5120). With this in mind, the following control is effected in the present device.

Figure 3:
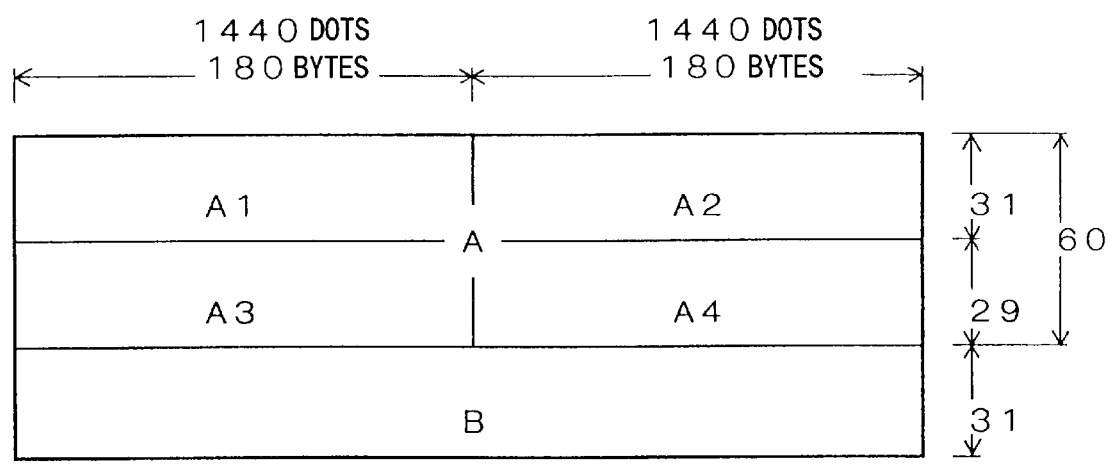
FIG. 3 is a schematic view showing an arrangement of a buffer memory in the first embodiment.

The memory region (32 KB) of the buffer memory 31 is divided into memory regions A and B as shown in FIG. 3. The memory region A is adapted for storing one line print data, so that it has a capacity capable of storing data of one line with which one character array can be printed in one line. To this effect, the memory region A has a capacity of 21600B (2880×60=21600B) On the other hand, the memory region B serves as a temporarily storing region, and has a capacity of 11968B which is a difference by subtracting the capacity of the memory region A from the entire memory region (32×1024−21600=11968). Thus, the memory region B can have buffer region for storing data of 31 rasters (11968/360=31, here "360" is the buffer size constituting one raster as described above).

The memory region A is divided into a first memory area A1+A2 and a second memory area A3+A4. The first memory area is capable of storing 31 raster size, and the second memory area is capable of storing 29 raster size. In other words, the first and second memory areas are divided into 31 rasters and 29 rasters, respectively. Further, the first memory area is divided into two area A1 and A2, and the second memory area is divided into two areas A3 and A4 for storing print data of front half portion of one line in A1 and A3 and for storing print data of rear half portion of the line in A2 and A4.

The first memory area A1+A2 has the raster size (31 rasters) equal to that of the second memory region B. This is due to the fact that the memory region A must have a particular memory area equal to that of the memory region B. As described later, the memory region B has a capacity half the capacity of the memory region A because data of one line printing can be stored in the memory region B in co-operation with the memory region A. In other word, the memory region B is not necessarily provided with large storing capacity because of the co-operation with the empty memory area A1 and A3 or A2 and A4 of the memory region A.

Next, a flow of the print data and printing operation will be described with reference to FIGS. 4 through 9. In a n initial state, no print data are stored in both memory regions A and B.

Figure 4:
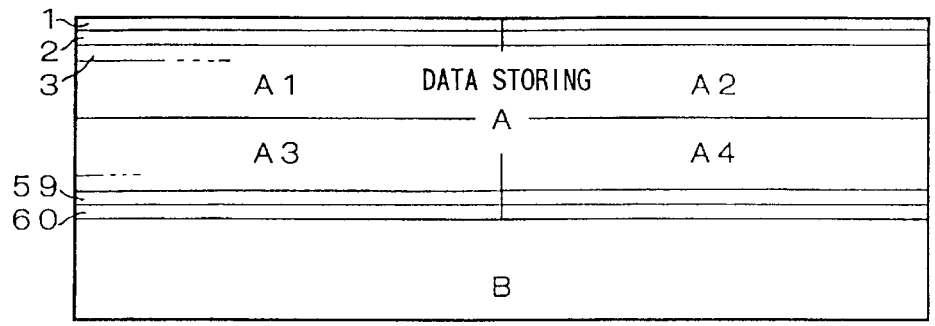
FIGS. 4 through 9 are views for description of an operation of the buffer memory according to the first embodiment in which raster scan data are used.

(1) When print data is received in the write-in portion 30, the memory region A is nominated by the region command portion 32, so that from first raster to 60th raster are successively stored in the memory region A to store therein the print data as shown in FIG. 4.

Figure 5:
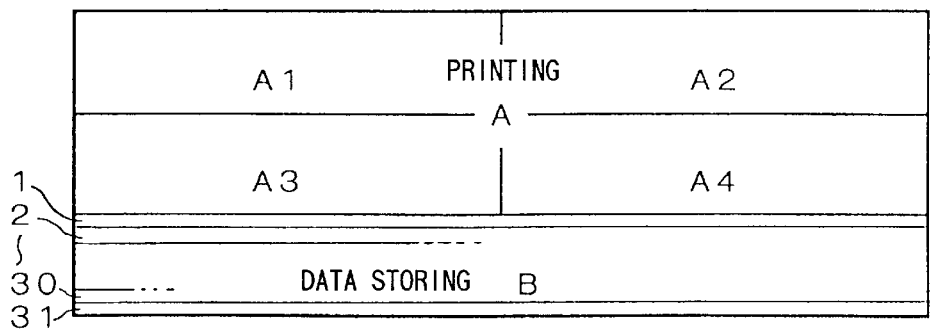

(2) When the print data of one line corresponding to 60 rasters is set up in the memory region A, print start signal is output from the host computer or from a CPU of the printer. Therefore, print data is transmitted from the memory region A to the read out portion 34, so that printing is performed while moving the print head 20 in the character array direction. In this instant, as shown in FIG. 5, the region command portion 32 nominates the memory region B for storing print data of the next line. Accordingly, in the memory region B, print data corresponding to 31 rasters is formed.

Figure 6:
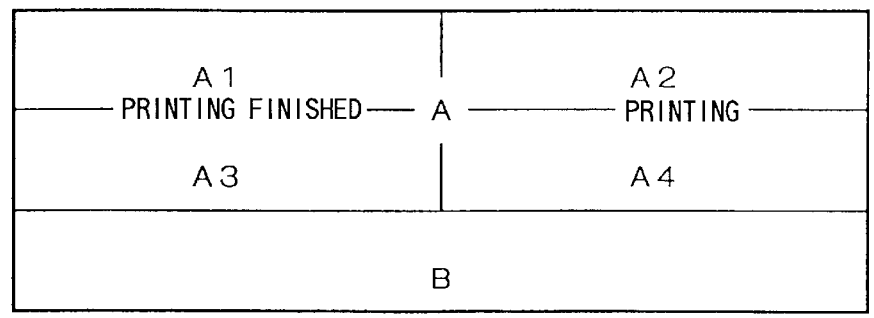

(3) Data storage of print data corresponding to 31 rasters in the memory region B can be conducted within the acceleration period of the carriage 21 and a period for printing front or rear half of one line. In this connection, as shown in FIG. 6 judgment is made in the CPU of the printer as to whether or not printing based on the print data stored in the front half are as A1 and A3 has been completed if print head is moved from left to right in FIG. 1. (If the print head is moved from the right to left, the CPU makes judgment as to whether or not printing based on the print data stored in the rear half areas A2 and A4 has been completed.)

Figure 7:
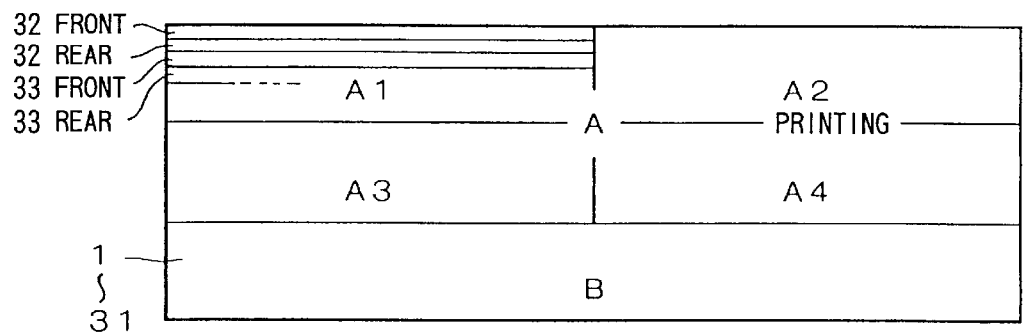

(4) Then, region command portion 32 nominates the empty regions A1 and A3 to which remaining 32nd through 60th rasters of the next line are stored in the regions A1 and A3. However, the regions A1 and A3 allow storage of the data of the front half line, the front half area and rear half area of each raster is juxtaposedly stored in A1 and A3 as shown in FIG. 7. In other words, one dot line data in the character array direction is divided into two dot line data and are stored in the regions A1 and A3. During this storage, printing is still performed based on the print data stored in the areas A2 and A4, and data storage in the areas A1 and A3 can be completed until the rear half printing is completed and the carriage 21 is stopped. Incidentally, one line printing is completed based on the data stored in the memory regions A1 through A4 and transmitted to the printer mechanism 10.

Further, under the command from the region command portion 32, empty memory regions can be efficiently used, so that it is unnecessary to use a buffer memory provided with large storage capacity. Moreover, dead time can be shortened for completing storage of print data of one line into the buffer memory 31. Furthermore, efficient utilization of the empty memory regions can also be attained by the juxtaposed storage manner with respect to the front half and rear half area of each raster.

Figure 8:
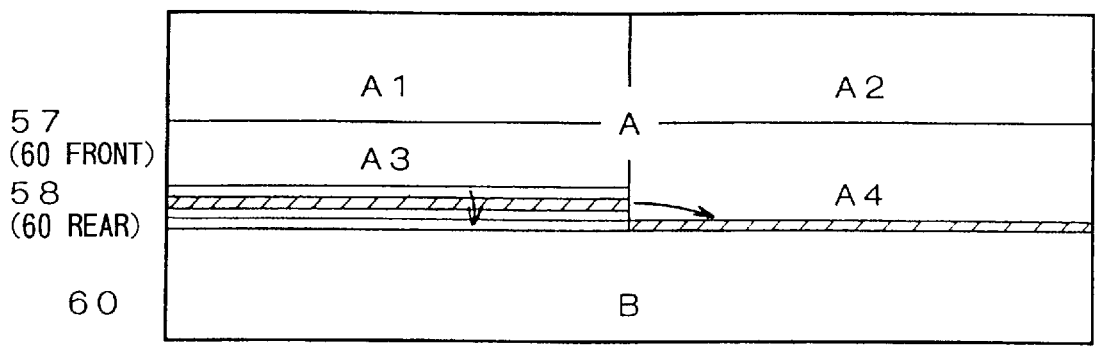
Figure 9:
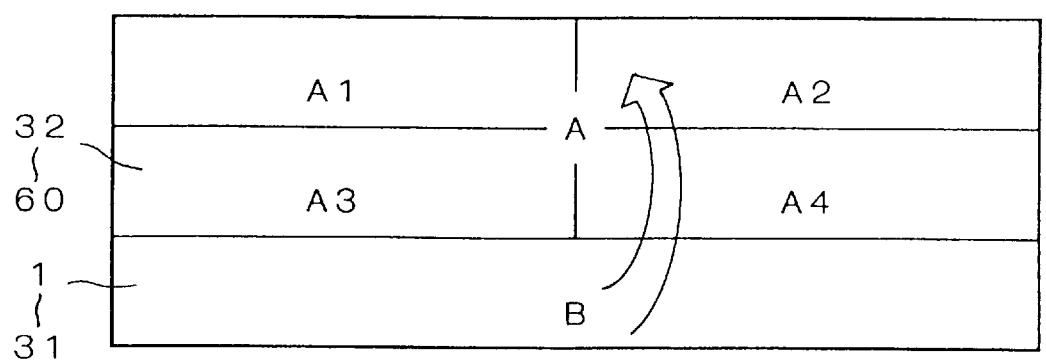

(5) When the printing of the rear half line based on the print data retrieved from the regions A2 and A4 is completed, print data in the regions A1 and A3 are transferred by the transfer portion 33 to the different line area of the regions A3 and A4 as shown in FIG. 8. In this case, the regions A1 and A3 has stored data amounting 29 rasters (from 32nd. to 60th. rasters), in which 60th raster is stored at 57th and 58th line area in the region A3. Accordingly, no data have been stored in the last two line areas, i.e., 59th and 60th line areas of the region A3. Consequently, data stored at 57th line area of the region A3 can be transferred to the 60th line area of the region A3, and the data stored at 58th line area of the region A3 can be transferred to the 60th line area of the region A4. Thus, 60th raster data for the next line printing can be stored in the regions A3 and A4. In the same manner, front and rear half data of each raster for the next line can be transferred to the line area of the region A3, and line area of the region A4, respectively. In other words, the line areas in the regions A3 and A4 are successively occupied from the bottom by the raster data from the bottom.

(6) As a result, when all print data stored in the regions A1 and A3 have been ditributingly transferred to the regions A3 and A4, the region A1 becomes empty while the region A2 has already been empty. Because the capacity of the region B is equal to that of the region A1+A2, as shown print data stored in the region B can be transferred in it entirety to the regions A1 and A2. Thus, all print data of the next line can be stored in the regions A1 through A4.

Thereafter, judgment is made as to which one of the leading end and trailing end of the next line to be printed is positioned closer to the present print head. After the judgment, printing is performed starting from the selected end in a manner similar to the process (2). The process (2) through (6) are repeatedly carried out until printing of all lines are completed. In spite of small storage capacity of the buffer memory 31, judgment as to the print start end position is conducted with respect to the one line printing because of the effective data storage and transfer fashion in between the data storage region A and the temporary data storage region B.

Figure 10:
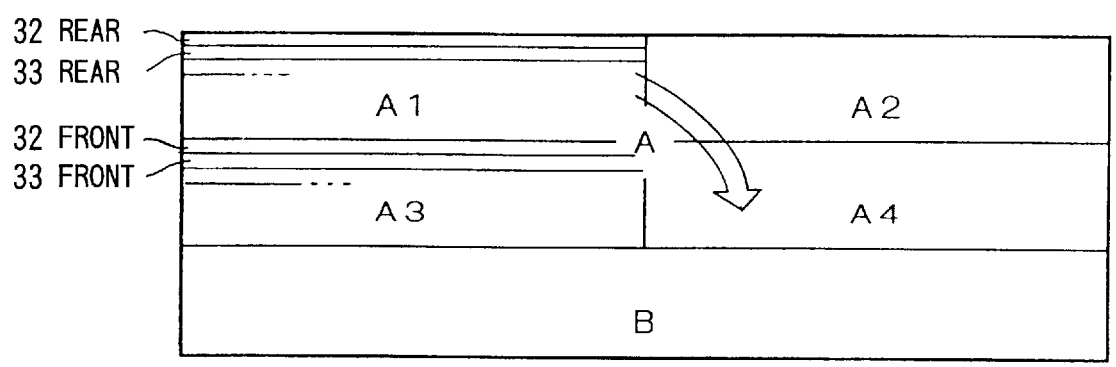
FIGS. 10 is a view for description of a modified operation of the buffer memory.

Incidentally, FIG. 10 shows modification to the above described process. That is, instead of the process (4) described above, print data of the front half portion of each raster are stored in the memory region A3 whereas the print data of the rear half portion of each raster are stored in the memory region A1. With this storage mode, instead of the process (5) described above, print data which have been stored in the memory region A1 is only transferred to the memory region A4, By such a modified process, data transfer amount within the buffer memory 31 can be reduced, because no data transfer is required with respect to the print data which have been stored in the memory region A3. In other words, in the modified process, the print data which will not be subjected to transfer within the buffer memory are beforehand selected and the selected data are stored in the memory region A3.

The above described process can be summarized in the following time chart Table 3 in which "S" implies output of print data from the host computer to the buffer memory, "R" implies receipt of the print data in the buffer memory, "p" implies printing operation, and "T" implies data transfer from one memory region to the other memory region in the buffer memory:

TABLE 3

| Process | (1) | (2) | (4) | (5) | (6) | (2) |
|---|---|---|---|---|---|---|
| Host Comp. | ← S → | ← S → | | | | ← S → |
| Region A1 | ← R → | ← P → | ← R → | ← T → | ← T → | ← P → |
| Region A2 | ← R → | ← P → | ← P → | | ← T → | ← P → |
| Region A3 | ← R → | ← P → | ← R → | ← T → | | ← P → |
| Region A4 | ← R → | ← P → | ← P → | ← T → | | ← P → |
| Region B | | ← R → | | | ← T → | ← R → |

As is apparent from the Table 3, the transmission of the print data from the host computer to the printer is suspended or interrupted only when the print data transfer is performed within the buffer memory 31. The data transfer within the buffer memory requires extremely shorter period than the data transmission period from the host computer to the printer or the operation period of the printing mechanism, and therefore, the data transfer period can be neglected.

As described above, in the first embodiment, even though the buffer memory 31 is not capable of storing print data of two lines at one time, cooperation of the memory region B, which is the difference by subtracting the buffer memory region A capable of storing print data of one line only from the entire buffer memory area, and the memory area A1 and A3 (or A2 and A4) can provide continuous printing operation, as if the buffer memory can perform two line printing operation mode.

In other words, in the illustrated embodiment, the print data are stored in data storage region. i. e., memory region A and a temporary data storage region, i.e., memory region B, and if storage of another print data in the data storage region can become possible as a result of data transfer to the printing mechanism from the data storage region, print data which have been stored in the temporary data storage region are transferred to the data storage region. Therefore, high data processing ability can be provided irrespective of small storage capacity in comparison with a storage capacity of a conventional storage unit capable of storing print data of two lines.

Further, the data of a subsequent line can be stored into the temporary data storage region during printing operation for printing the precedent line based on the print data stored in the data storage region. For printing the subsequent line, print data stored in the temporary data storage region can only be transferred to the data storage region, i.e., only data transfer "within" the entire buffer memory is required. This is time saving in comparison with entire data storage into the buffer region by the data transmission from the host computer. Accordingly, dead storage time can be shortened. Accordingly, an ink jet printer having high resolution power and high printing efficiency can be provided with the buffer memory having low storage capacity.

print data storage mode according to a second embodiment of the present invention will next be described with reference to FIGS. 11 through 14. In the second embodiment, the print data transmitted from the host computer are so called columnar scan image data. That is, print data of first dot line in the sheet feed direction are successively transmitted by a unit of one byte, and upon completion of transmission of the data of the first dot line, print data of second dot line in the sheet feed direction are transmitted.

Figure 11:
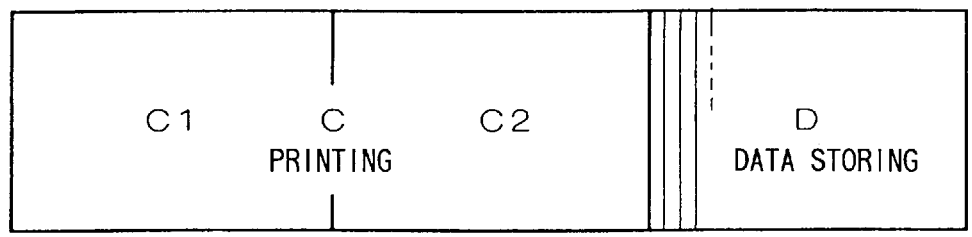
FIGS. 11 through 14 are views for description of an operation of a buffer memory according to a second embodiment of the present invention in which columnar scan data are used.

In FIG. 11, a buffer memory is divided into frontward and rearward memory regions C and D. Further, the frontward memory region C is approximately equi-divided into a front memory section C1 and a rear memory section C2. The frontward memory region C has a memory capacity capable of storing print data of one line, and the rearward memory region D has a memory capacity capable of storing print data of half line similar to the regions A and B, respectively.

In FIG. 11, print data of one line transmitted into the buffer memory are stored in the memory sections C1 and C2. Upon completion of the storage, printing operation is started based on the stored print data. Simultaneously, storage of print data of the next line into the memory region D is started.

Figure 12:
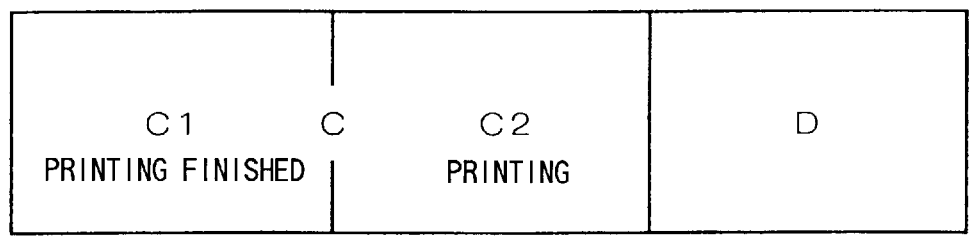
Figure 13:
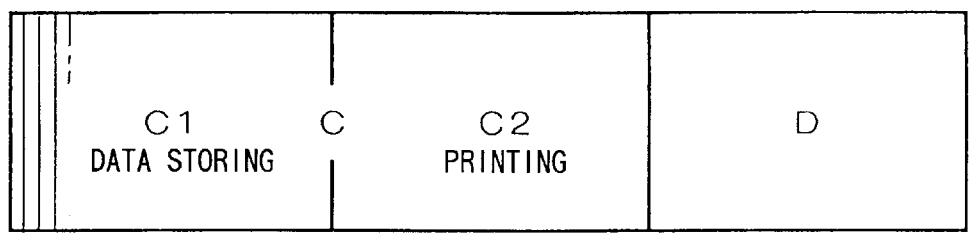

In FIG. 12, assuming that the first line printing is carried out from left to the right, by the time printing based on the front memory section C1 has been completed, storage of the print data of the front half portion of the next line into the memory region D has been completed. Therefore, as shown in FIG. 13, it is possible to start storage into the front memory section C1 of the print data with respect to the rear half portion of the next line.

Figure 14:
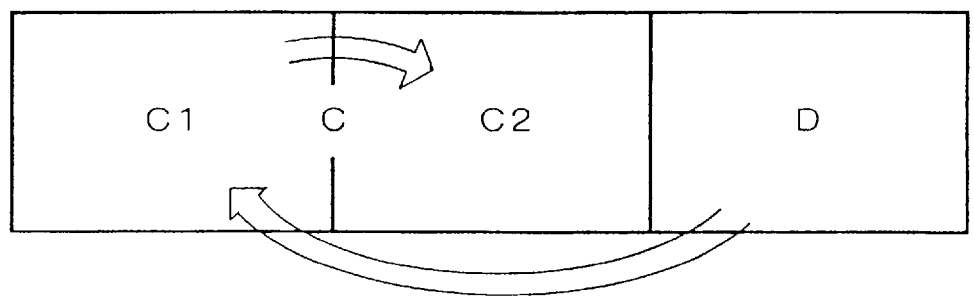

By the time printing based on the print data stored in the rear memory section C2 has been completed, storage of the print data of the rear half portion of the next line into the front memory section C1 has been completed. Upon completion of printing based on the print data stored in the rear memory section C2, print data stored in the front memory section C1 are transferred to the rear memory section C2, and further, the print data stored in the memory region D are transferred to the front memory section C1 as shown in FIG. 14. Thus, print data with respect to the next line can be stored in the front and rear memory sections C1 and C2. Then, judgment is made as to which one of the leading end and trailing end of the next line is closer to the present position of the print head, and printing is performed starting with the judged end. Furthermore, as shown in FIG. 11, storage of print data of a subsequent line into the region D is started.

Incidentally, since in the columnar scan mode the dot numbers (maximum: 60) in the sheet feed direction is greatly smaller than the dot numbers (maximum:2880) in the character array direction in case of the raster scan mode, it is unnecessary to divide front half and rear half raster line into two lines shown in FIG. 10.

While the invention has been described in detail and with reference to specific embodiment thereof, it would be apparent to those skilled in the art that various changes and modifications may be made therein without departing from the spirit and scope of the invention. For example, in the illustrated embodiment,the first and second moving mechanisms 22 and 24 are adapted to move the print head 20 in the character array direction and to move the sheet in the sheet feed direction, respectively. However, The first and second moving mechanisms can be used to move the sheet in the character array direction and to move the print head 20 in the sheet feed direction. In any event the moving mechanism is adapted to provide relative movement of the print head 30 with respect to the sheet 23 in the X- and Y-directions.

Further, in the illustrated embodiment the ink jet type print head 20 is used. However, can be used a dot matrix type print head such as a dot impact type print head using a plurality of print hammer wires and a thermal head using a plurality of h eat generating elements.

Furthermore, in the illustrated embodiment, after front half or rear half portion of one line has been printed, the print data of the subsequent line is stored in the empty region of the buffer memory. However, it is possible to suspend storage of the print data to the empty region until printing of all portion of the line is completed. In the latter case, upon completion of printing of one line, print data(raster line area 1 to 31) which have been stored in the memory region B are transferred to the memory regions A1 and A2, and then, remaining print data (raster lines 32 to 60) are newly transmitted into the memory areas A3 and A4.

Furthermore, in the foregoing embodiments, when storing print data into the regions B, A1 and A3 (or B, A2 and A4), or into the regions D and C1 (or D and C2), data compression can be made in which vacant dot data are omitted, and the compressed data will be restored when the compressed data are transferred to the regions A and C to complete one line data.

What is claimed is:

1. A print data storing unit connected to a printing mechanism of a printer for storing print data and sending the print data to the printing mechanism having a print head, the printing mechanism performing printing on a printing sheet based on the print data; the unit comprising:

a print data storing region for storing print data with which one time printing is performed by relative movement of the print head with respect to the printing sheet in a first print-out direction or a second print-out direction, wherein the second print-out direction is opposite to the first print-out direction;

a temporary data storing region for temporarily storing another print data;

a storage region command portion which alternatively appoints and alternatively accesses at least one of the print data storing region and the temporary print data storage region so as to store print data into the appointed one of the regions;

a read portion for sending the print data stored in the print data storing region to the printing mechanism so as to perform one time printing on the printing sheet; and a data transfer portion means for transferring the other data stored in the temporary data storing region into the print data storing region when an empty area is provided in the print data storing region as a result of sending of the print data to the printing mechanism, the print data storing region and the temporary data storing region having a total data storage capacity capable of storing data with which printing is performed in one time printing by relative movement of the print head with respect to the printing sheet in the first print-out direction or the second print-out direction but incapable of storing data with which printing is performed twice by relative movement of the print head with respect to the printing sheet in the first print-out direction and the second print-out direction.

2. A print data storing unit as claimed in claim 1, wherein the other print data are stored in the temporary data storing region during printing operation based on the print data stored in the print data storing region and sent to the printing mechanism, the other print data being print data with which a subsequent printing will be performed.

3. A print data storing unit as claimed in claim 2, wherein the printing mechanism further comprises a moving mechanism for moving the print head in the first print-out direction or the second print-out direction, the first print-out direction being a character array direction, and, the print data storing region having a data storage capacity capable of storing print data with which printing is performed by operation of the moving mechanism once to move the print head in the character array direction or a direction opposite the character array direction or a direction opposite the character array direction.

4. A print data storing unit as claimed in claim 3, wherein the temporary data storage region has a data storage capacity smaller than that of the print data storage region.

5. A print data s to ring unit as claimed in claim 4, wherein the print data storing region is divided into a first section for storing therein print data of a front half portion of one time printing and a second section for storing therein print data of a rear half portion of the one time printing, the storage region command portion appointing one of the first and second sections from which precedent print data have already been sent by the read portion to the printing mechanism for storing subsequent print data into the appointed section.

6. A print data storing unit as claimed in claim 5, where in print data subsequent to the other print data stored in the temporary data storing region is stored into one of the first and second sections as the subsequent print data.

7. A print data storing unit as claimed in claim 6, wherein the data transfer portion transfers the other print data which have been stored in the temporary data storing region to the print data storing region and also performs data transfer with respect to the subsequent print data within the print data storing region, so that in the print data storing region entire print data are stored with which a second time printing is performed by the relative movement of the print head with respect to the printing sheet in the first print-out direction or the second print-out direction.

8. A print data storing unit as claimed in claim 7, wherein the print data are arrayed in a print data array, and wherein the data array is modified into another data array when the print data are stored in one of the first and second sections of the print data storing region.

9. A print data storing unit as claimed in claim 8, wherein the print data array comprises a raster scan data in which one dot array in one time printing in the character array direction is provided, the modified other data comprising a front half one dot array and a rear half one dot array juxtaposed with the front half one dot array.

10. A print data storing unit as claimed in claim 9, further comprising read out direction command portion for instructing the read portion reading out direction of the print data stored in the print data storing region and for instructing the printing mechanism either the first print-out direction or the second print-out direction.

11. A print data storing unit as claimed in claim 10, wherein the print data storing region is divided into first memory area and a second memory area, the first memory area having print data storage capacity equal to that of the temporary data storing region, so that the other print data which have been stored in the temporary data storing region can be transferred to the first memory area by the data transfer portion, the first and second memory area being respectively divided into the first section and the second section.

12. A print data storing unit as claimed in claim 11, wherein the temporary data storing region stores therein print data of front half portion of one time printing, and one of the first and second sections in the print data storing region stores therein print data of rear half portion of the one time printing.

13. A print data storing unit as claimed in claim 1, wherein the print head comprises an ink jet type print head.

14. A printer comprising:

a printing mechanism comprising a print head, and a print head moving mechanism for providing a relative movement of the print head in a character array direction and a sheet feed direction with respect to a printing sheet; and a print data storing unit connected to the printing mechanism for storing print data and sending the print data to the printing mechanism, the print data storing unit comprising:

a buffer memory having a print data storing region and a temporary data storing region, the data storing region storing print data with which one time printing is performed by relative movement of the print head with respect to the printing sheet in one or opposite print-out direction, and the temporary data storing region temporarily storing another print data;

a storage region command portion which alternatively appoints and alternatively accesses at least one of the print data storing region and the temporary print data storage region so as to store print data into the appointed one of the regions;

a read portion for sending the print data stored in the print data storing region to the printing mechanism so as to perform one time printing on the printing sheet; and a data transfer portion means for transferring the other data stored in the temporary data storing region into the print data storing region when an empty area is provided in the print data storing region as a result of sending of the print data to the printing mechanism, the print data storing region and the temporary data storing region having a total data storage capacity capable of storing data with which printing is performed in one time printing by relative movement of the print head with respect to the printing sheet in one or opposite print-out direction but incapable of storing data with which printing is performed twice by relative movement of the print head with respect to the printing sheet in one and opposite print-out direction.

15. A printer as claimed in claim 14, wherein the other print data are stored in the temporary data storing region during printing operation based on the print data stored in the print data storing region and sent to the printing mechanism, the other print data being print data with which a subsequent printing will be performed.

16. A printer as claimed in claim 15, wherein the printing mechanism further comprises a moving mechanism for moving the print head in one or opposite print-out direction, the print-out direction being a character array direction, and, the print data storing region having a data storage capacity capable of storing print data with which printing is performed by operation of the moving mechanism once to move the print head in one or opposite character array direction.

17. A printer as claimed in claim 16, wherein the temporary data storage region has a data storage capacity smaller than that of the print data storage region.

18. A printer as claimed in claim 17, wherein the print data storing region is divided into a first section for storing therein print data of a front half portion of one time printing and a second section for storing therein print data of a rear half portion of the one time printing, the storage region command portion appointing one of the first and second sections from which precedent print data have already been sent by the read portion to the printing mechanism for storing subsequent print data into the appointed section.

19. A printer as claimed in claim 18, wherein print data subsequent to the other print data stored in the temporary data storing region is stored into one of the first and second sections as the subsequent print data.

20. A printer as claimed in claim 19, wherein the data transfer portion transfers the other print data which have been stored in the temporary data storing region to the print data storing region and also performs data transfer with respect to the subsequent print data within the print data storing region, so that in the print data storing region entire print data are stored with which a second time printing is performed by the relative movement of the print head with respect to the printing sheet in opposite or one print-out direction.

21. A printer as claimed in claim 20, wherein the print data are arrayed in a print data array, and wherein the data array is modified into another data array when the print data are stored in one of the first and second sections of the print data storing region.

22. A printer as claimed in claim 21, wherein the print data array comprises a raster scan data in which one dot array in one time printing in the character array direction is provided, the modified other data comprising a front half one dot array and a rear half one dot array juxtaposed with the front half one dot array.

23. A printer as claimed in claim 22, further comprising read out direction command portion for instructing the read portion reading out direction of the print data stored in the print data storing region and for instructing the printing mechanism either one or opposite print-out direction.

24. A printer as claimed in claim 23, wherein the print data storing region is divided into first memory area and a second memory area, the first memory area having print data storage capacity equal to that of the temporary data storing region, so that the other print data which have been stored in the temporary data storing region can be transferred to the first memory area by the data transfer portion, the first and second memory area being respectively divided into the first section and the second section.

25. A printer as claimed in claim 24, wherein the temporary data storing region stores therein print data of front half portion of one time printing, and one of the first and second sections in the print data storing region stores therein print data of rear half portion of the one time printing.

* * * * *